July 17, 1934. C. A. FLEMING 1,966,493
VACUUM REGULATOR FOR WINDSHIELD WIPERS
Filed Aug. 5, 1931
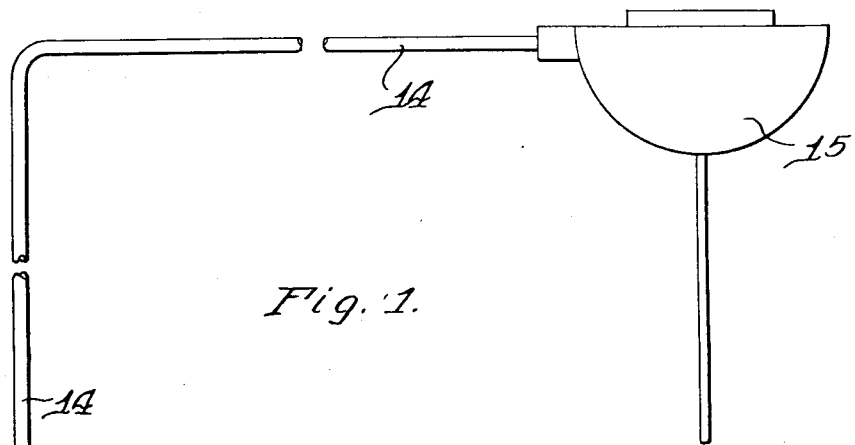
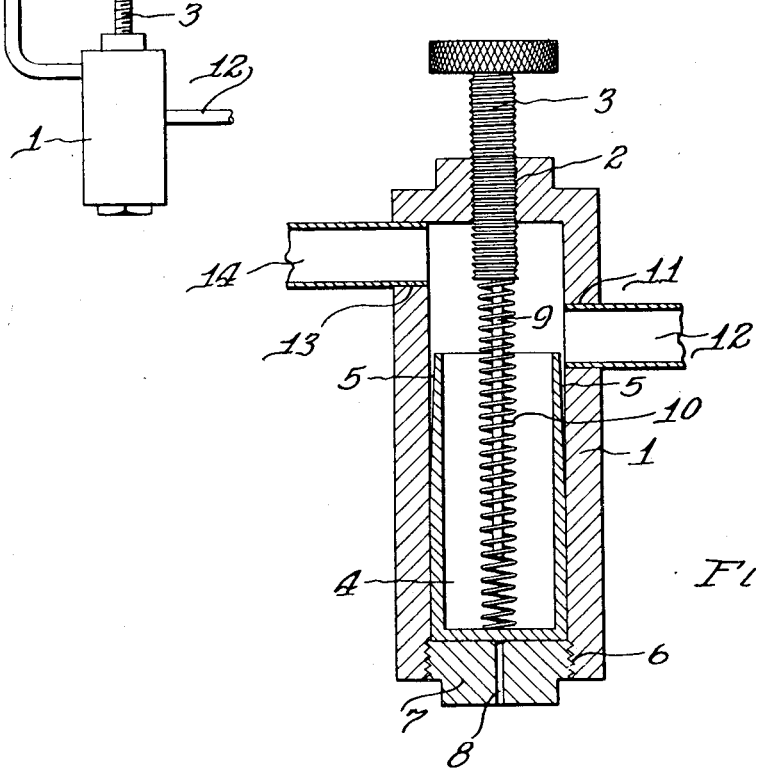
INVENTOR
Charles A. Fleming.

Patented July 17, 1934

1,966,493

UNITED STATES PATENT OFFICE 1,966,493

VACUUM REGULATOR FOR WINDSHIELD WIPERS

Charles A. Fleming, Pontiac, Mich.

Application August 5, 1931, Serial No. 555,325

4 Claims. (Cl. 137—153)

The present invention pertains to a novel vacuum regulator for vacuum operated devices such as windshield wipers on automobiles and like vehicles.

As being constructed at present, the control valves of vacuum-operated windshield wipers must be continually adjusted by the operator, otherwise the wipers either operate at destructively high speeds when the vacuum is high or they slow down or stop altogether when the vacuum is low.

The primary object of the present invention is to provide a suction operated valve that may be interposed between a source of vacuum such as the intake manifold of an automobile and a vacuum-operated device such as a windshield wiper to control the movement or speed thereof in a manner whereby it is operated at a substantially constant speed regardless of any increase or decrease in the vacuum.

My regulator contemplates the use of a windshield wiper capable of operating at satisfactory speed even when actuated by the lowest vacuum existing in the intake manifold under any condition of engine operation, although it also greatly improves the operation of windshield wipers of lesser capacity by preventing destructive, high-speed operation.

In one form of the present invention I provide a regulating screw mounted in a suitable casing, the screw acting through the medium of a coiled spring upon a vacuum controlled floating valve preferably having a tapered portion which controls the size of the opening that provides the communication between the vacuum passage that is connected to the intake manifold and the pipe that is connected to the windshield wiper. The casing may be inserted in the pipe line between the intake manifold of the automobile and the windshield wiper at any convenient point and may be attached to the dash or windshield in any suitable manner or it may be attached to or formed as part of the windshield wiper casing.

Where more convenient for any reason, the regulator may be placed at the intake side of the suction-operated device and will function as effectively as if placed in the connection between the device and the source of suction.

With the above and other ends in view the invention consists in matters hereinafter set forth and more particularly pointed out in the appended claims, reference being had to the accompanying drawing, in which Figure 1 is a side elevation of the present regulator valve connected to a conventional windshield wiper, and Fig. 2 is a cross sectional view of the valve.

Like characters of reference are employed throughout to designate corresponding parts.

The numeral 1 indicates a cylindrical casing having a screwthreaded bore 2 in the upper end thereof in which is received a hand operated screw 3. Received within the casing to float therein is a hollow piston 4 having its upper end slightly tapered as at 5. The lower end of the casing 1 is internally screwthreaded as at 6 to receive a plug 7 having a port 8 drilled therein.

On the bottom of the screw 3 that projects into the casing 1 is mounted a stem 9 and surrounding the stem 9 is a coil spring 10, the latter having one end engaging the screw 3 and its opposite end engaging the bottom wall of the piston 4.

A hole 11 is drilled in the side wall of the casing 1 and is connected by a pipe 12 to a source of suction, such as the intake manifold of an automobile. A hole 13 is drilled in the opposite wall of the casing 1 and is connected by a pipe 14 to a windshield wiper 15.

In describing the operation it will be understood that the vacuum in the intake manifold of an automobile varies considerably during operation and therefore ordinarily the rate of speed at which the windshield wiper operates is not constant and therefore the suction in the pipe 12 varies in degree. The air is drawn through the windshield wiper 15, through the pipe 14, through the casing 1 and out the pipe 12, passing over top of the piston 4. Atmospheric pressure is admitted to the bottom of the piston 4 through the port 8 in the plug 7 and tends to force the piston upwardly inasmuch as the pressure in the casing 1 above the piston is less than atmospheric. The screw 3 is moved downwardly until it holds the spring 10 compressed to such a degree that it holds the piston 4 against the bottom of the casing, the spring exerting just enough pressure to combine with less than atmospheric pressure in the casing in equaling the atmospheric pressure through the port 8 in order to hold the piston stationary.

When the piston 4 is in its normal position at the bottom of the casing 1 the passage of air between the holes 11 and 13 is unrestricted. When the pressure in the casing 1 drops to a lower degree however, the atmospheric pressure through the port 8 overcomes the pressure of the spring 10 and forces the piston to move axially toward the hole 11 and to partly cover the hole 11 and restrict the amount of air passing therethrough and therefore even though the pressure becomes lower in the line 12 the amount of air passing through the casing 1 in a given period of time remains substantially the same as when the partial vacuum was not so great and the rate of speed at which the wiper operates remains substantially unchanged.

To vary the rate of speed at which the wiper shall operate, the screw 3 is moved axially to increase or decrease the pressure exerted by the spring 10 on the piston 4. If the pressure of the spring is greater the piston 4 remains stationary during a greater drop in pressure in the casing 1 and the windshield wiper is operated at a higher rate of speed whereas if the pressure of the spring 10 is lessened the piston 4 moves upwardly as a result of a comparatively small drop in pressure in the casing and the wiper accordingly operated at a slower constant rate of speed.

Although a specific embodiment of the present invention has been illustrated and described it is to be understood that various changes may be made in the details of construction without departing from the spirit of the invention as set forth in the appended claims, and such changes are contemplated.

What I claim is:

1. A suction operated regulating valve comprising a body having a cylindrical chamber, said body having an air inlet port communicating with said chamber, said body having an outlet port communicating with said chamber and adapted to be connected to a source of suction, one of said ports entering the side of said chamber and being spaced from an end thereof, said body having an air inlet entering the opposite end of said chamber, a piston slidably received in said chamber and forming a movable wall between said inlet and said first named ports, said piston normally having one end disposed adjacent said port which is spaced from said end, and adjustable pressure means mounted in said end adjacent said ports and engaging said piston to exert resilient pressure tending to move said piston away from said adjacent port, adjustable positive means for limiting the movement of said piston, said resilient pressure means being adapted to be compressed by said piston as a result of atmospheric pressure on said piston when suction in said outlet creates a partial vacuum in said chamber whereby said piston moves slidably to partially obstruct said adjacent port.

2. A suction operated regulating valve comprising a body having a cylindrical chamber, said body having an air inlet port communicating with said chamber, said body having an outlet port communicating with said chamber and adapted to be connected to a source of suction, one of said ports entering the side of said chamber and being spaced from an end thereof, said body having an air inlet entering the opposite end of said chamber, a piston slidably received in said chamber and forming a movable wall between said inlet and said first named ports, said piston having a gradually tapered end normally disposed adjacent said port which is spaced from said end, and adjustable pressure means mounted in said end adjacent said ports and engaging said piston to exert resilient pressure tending to move said piston away from said adjacent port, adjustable positive means for limiting the movement of said piston, said resilient pressure means being adapted to be compressed by said piston as a result of atmospheric pressure on said piston when suction in said outlet creates a partial vacuum in said chamber whereby said piston moves slidably to partially obstruct said adjacent port.

3. A suction operated regulating valve comprising a body having a cylindrical chamber, said body having an air inlet port entering said chamber adjacent one end thereof, said body having an outlet port entering said chamber at a point spaced from said end, a line connected to said outlet and adapted to be connected to a source of suction, said body having an air inlet passage, entering said chamber in the opposite end thereof, a piston slidably received in said chamber between said outlet port and said inlet passage and arranged with one end adjacent said outlet port, and adjustable pressure means mounted in said end adjacent said port and normally exerting resilient pressure tending to move said piston away from said outlet port, adjustable positive means for limiting the movement of said piston, said piston being adapted to be moved against the urge of said pressure means to partially obstruct said outlet port by atmospheric pressure entering said inlet passage when the chamber on the outlet side of said piston is rarified by suction.

4. A suction operated regulating valve comprising a body having a cylindrical chamber, said body having an air inlet port entering said chamber adjacent one end thereof, said body having an outlet port entering said chamber at a point spaced from said end, a line connected to said outlet and adapted to be connected to a source of suction, said body having an air inlet passage entering said chamber in the opposite end thereof, a piston slidably received in said chamber between said outlet port and said inlet passage, said piston having a gradually tapered end normally disposed adjacent said outlet port, and adjustable pressure means mounted in said end adjacent said ports and normally exerting resilient pressure tending to move said piston away from said outlet port, adjustable positive means for limiting the movement of said piston, said piston being adapted to be moved against the urge of said pressure means by atmospheric pressure entering said inlet passage when said chamber on the opposite side of said piston is rarified by suction, whereby said gradually tapered portion is moved to a point partially obstructing flow of air through said outlet.

CHARLES A. FLEMING.